US012333926B2

(12) United States Patent
Lan (10) Patent No.: US 12,333,926 B2
(45) Date of Patent: *Jun. 17, 2025

(54) EMERGENCY ALERT SYSTEMS AND METHODS FOR DIFFERENTLY ABLED PERSONS

(71) Applicant: T-Mobile USA, Inc., Bellevue, WA (US)

(72) Inventor: Wei-Ming Lan, Newcastle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/652,742

(22) Filed: May 1, 2024

(65) Prior Publication Data

US 2024/0282181 A1   Aug. 22, 2024

Related U.S. Application Data

(63) Continuation of application No. 17/387,789, filed on Jul. 28, 2021, now Pat. No. 11,995,978.

(51) Int. Cl.
| | | |
|---|---|---|
| *G08B 5/22* | (2006.01) | |
| *G06F 40/58* | (2020.01) | |
| *G08B 3/10* | (2006.01) | |
| *G08B 25/10* | (2006.01) | |
| *G10L 13/00* | (2006.01) | |
| *H04W 4/90* | (2018.01) | |

(52) U.S. Cl.
CPC ............. *G08B 5/229* (2013.01); *G06F 40/58* (2020.01); *G08B 3/10* (2013.01); *G08B 25/10* (2013.01); *G10L 13/00* (2013.01); *H04W 4/90* (2018.02)

(58) Field of Classification Search
CPC .......... G08B 5/229; G08B 3/10; G08B 25/10; G08B 27/006; G06F 40/58; G10L 13/00; H04W 4/90
See application file for complete search history.

(56) References Cited

U.S. PATENT DOCUMENTS

| | | |
|---|---|---|
| 7,764,170 B2 | 7/2010 | Yi |
| 7,933,581 B2 | 4/2011 | Wijayanathan et al. |
| 8,037,151 B1 | 10/2011 | Daly et al. |

(Continued)

*Primary Examiner* — Quan Zhen Wang
*Assistant Examiner* — Rajsheed O Black-Childress
(74) *Attorney, Agent, or Firm* — Perkins Coie LLP (57) ABSTRACT

Emergency alert systems and methods for disabled and/or differently abled persons are disclosed. Upon receiving an alert message, the system translates the alert message to an audio message (text to speech) when the text to speech feature is enabled. In some implementations, the system waits for a threshold period of time (e.g., 30 seconds) to receive a user acknowledgment of the alert message, and translates the alert message to an audio message if no acknowledgment is received within this time. The user acknowledgment can be received via a selection of an option (e.g., by clicking an "OK" button) and/or via an audio option (e.g., by saying "Ok, received") when the text to speech feature is enabled. The system then outputs (e.g., reads out loud) the translated message so that the disabled or differently abled persons can be informed of the emergency situation. After outputting the translated message, the system can further wait for a user acknowledgment of the translated audio message.

20 Claims, 4 Drawing Sheets

(56) References Cited

U.S. PATENT DOCUMENTS

| | | | |
|---|---|---|---|
| 8,159,334 B2 | 4/2012 | Mcclenny et al. |
| 8,275,347 B2 | 9/2012 | Sennett et al. |
| 8,320,873 B2 | 11/2012 | Sennett et al. |
| 8,326,260 B1 | 12/2012 | Bradish et al. |
| 8,380,159 B2 | 2/2013 | Sennett et al. |
| 8,489,060 B2 | 7/2013 | Sennett et al. |
| 8,509,729 B2 | 8/2013 | Shaw |
| 8,554,169 B2 | 10/2013 | Daly et al. |
| 8,554,171 B2 | 10/2013 | Sennett et al. |
| 8,559,989 B2 | 10/2013 | Daly et al. |
| 8,649,758 B2 | 2/2014 | Sennett et al. |
| 8,731,513 B2 | 5/2014 | Lemberg et al. |
| 8,768,291 B2 | 7/2014 | Williams et al. |
| 8,792,853 B2 | 7/2014 | Chen et al. |
| 8,880,019 B1 | 11/2014 | Daly et al. |
| 8,923,807 B2 | 12/2014 | Daly et al. |
| 8,995,950 B2 | 3/2015 | Williams et al. |
| 9,173,070 B2 | 10/2015 | Daly et al. |
| 9,183,731 B1 | 11/2015 | Bokhary |
| 9,262,907 B2 | 2/2016 | Gould et al. |
| 9,693,210 B2 | 6/2017 | Sennett et al. |
| 9,706,263 B2 | 7/2017 | Alman et al. |
| 9,820,121 B2 | 11/2017 | Sennett et al. |
| 9,877,178 B2 | 1/2018 | Lemberg et al. |
| 9,930,426 B2 | 3/2018 | Alman et al. |
| 9,954,803 B1 | 4/2018 | Kominar |
| 9,967,635 B2 | 5/2018 | Gavade et al. |
| 10,009,742 B2 | 6/2018 | Sennett et al. |
| 10,045,187 B1 | 8/2018 | Soleimani |
| 10,051,447 B2 | 8/2018 | Sennett et al. |
| 10,362,469 B2 | 7/2019 | Sennett et al. |
| 10,368,224 B2 | 7/2019 | Hussaini |
| 10,424,185 B2 | 9/2019 | Cordes et al. |
| 10,433,144 B2 | 10/2019 | Sennett et al. |
| 10,477,374 B2 | 11/2019 | Sennett et al. |
| 10,616,664 B2 | 4/2020 | Alman et al. |
| 10,805,783 B2 | 10/2020 | Lemberg et al. |
| 10,992,399 B2 | 4/2021 | Rao et al. |
| 11,057,732 B2 | 7/2021 | Vagelos |
| 2003/0176798 A1 | 9/2003 | Simon |
| 2014/0273909 A1 | 9/2014 | Ballantyne et al. |
| 2014/0287711 A1 | 9/2014 | Williams et al. |
| 2015/0312739 A1* | 10/2015 | Burt ................. A61B 7/00 455/404.1 |
| 2019/0228617 A1* | 7/2019 | Stogel ............... G06F 40/205 |
| 2020/0296328 A1 | 9/2020 | Siminoff et al. |
| 2021/0067972 A1 | 3/2021 | Mcgrath et al. |
| 2021/0185404 A1 | 6/2021 | Kalaichelvan et al. |
| 2021/0233388 A1 | 7/2021 | Martin et al. |

\* cited by examiner

EMERGENCY ALERT SYSTEMS AND METHODS FOR DIFFERENTLY ABLED PERSONS

CROSS-REFERENCE TO RELATED APPLICATION(S)

This application is a continuation of U.S. patent application Ser. No. 17/387,789 entitled "EMERGENCY ALERT SYSTEMS AND METHODS FOR DIFFERENTLY ABLED PERSONS" and filed Jul. 28, 2021. The content of the foregoing application is incorporated herein by reference in its entirety.

BACKGROUND

Wireless Emergency Alerts (WEA) is an alerting network in the United States designed to disseminate emergency alerts to mobile devices such as cell phones and pagers.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Organizations are able to disseminate and coordinate emergency alerts and warning messages through WEA and other public systems by means of the Integrated Public Alert and Warning System. When the alert is received, a capable device emits a distinct alert sound with specific cadence to get a user's attention. In addition, an alert message with up to 360 characters pops up on the device's display. A user must acknowledge receiving the alert (e.g., by clicking "ok" on the displayed alert window). Otherwise, the alert sound is emitted periodically to get the user's attention until the user acknowledges the alert or a preset time period has passed since the alert was received. This conventional WEA alert process works well for users who can see the text on the display. However, for others (e.g., blind or visually impaired, or otherwise challenged persons), the conventional WEA alert process poses several challenges. For instance, while such persons are able to hear the alert sound, they are unable to determine the source, reasons, and/or urgency for the alert because they are unable to read the content of the alert message. Without the ability to see the specific alert message associated with the alert, disabled and/or other differently abled persons may be put in danger during emergency situations.

To overcome these and other deficiencies of the conventional WEA alert process, the inventor has conceived and reduced to practice emergency alert systems and methods for disabled and/or differently abled persons. Upon receiving an alert message, the disclosed systems and methods translate the alert message to an audio message (text to speech) when the text to speech feature is enabled. In some implementations, the system waits for a threshold period of time (e.g., 30 seconds) to receive a user acknowledgment of the alert message, and translates the alert message to an audio message if no acknowledgment is received within this time. The user acknowledgment can be received via a selection of an option (e.g., by clicking an "OK" button) and/or via an audio option (e.g., by saying "Ok, received") when the text to speech feature is enabled. The system then outputs (e.g., reads out loud) the translated message so that the disabled or differently abled persons can be informed of the emergency situation. After outputting the translated message, the system can wait for a user acknowledgment of the translated audio message. While the discussion herein is focused on disabled persons, one of skill in the art will understand that the disclosed system can apply to other situations where the recipient is unable to read the received alert message. For example, the disclosed system can help people who do not have a mobile device but are located near people who carry a mobile device with the feature enabled to know what's happening without looking at a device display. As another example, the disclosed system can help people who do not understand the language in which the alert message is written by translating the message from the received first language to a second language (e.g., translating from English to Spanish) before outputting the translated audio message. As another example, the disclosed system can help people who are unable to easily access their device to read the alert text. For example, the system can help a plumber/handyman/tree man/driver etc. who, because of their current situation (e.g., location, position, time of day, legal rules/regulations), cannot access their device to safely read the alert text. Numerous other situations exist where the disclosed system can be helpful to people.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

Figure 1:
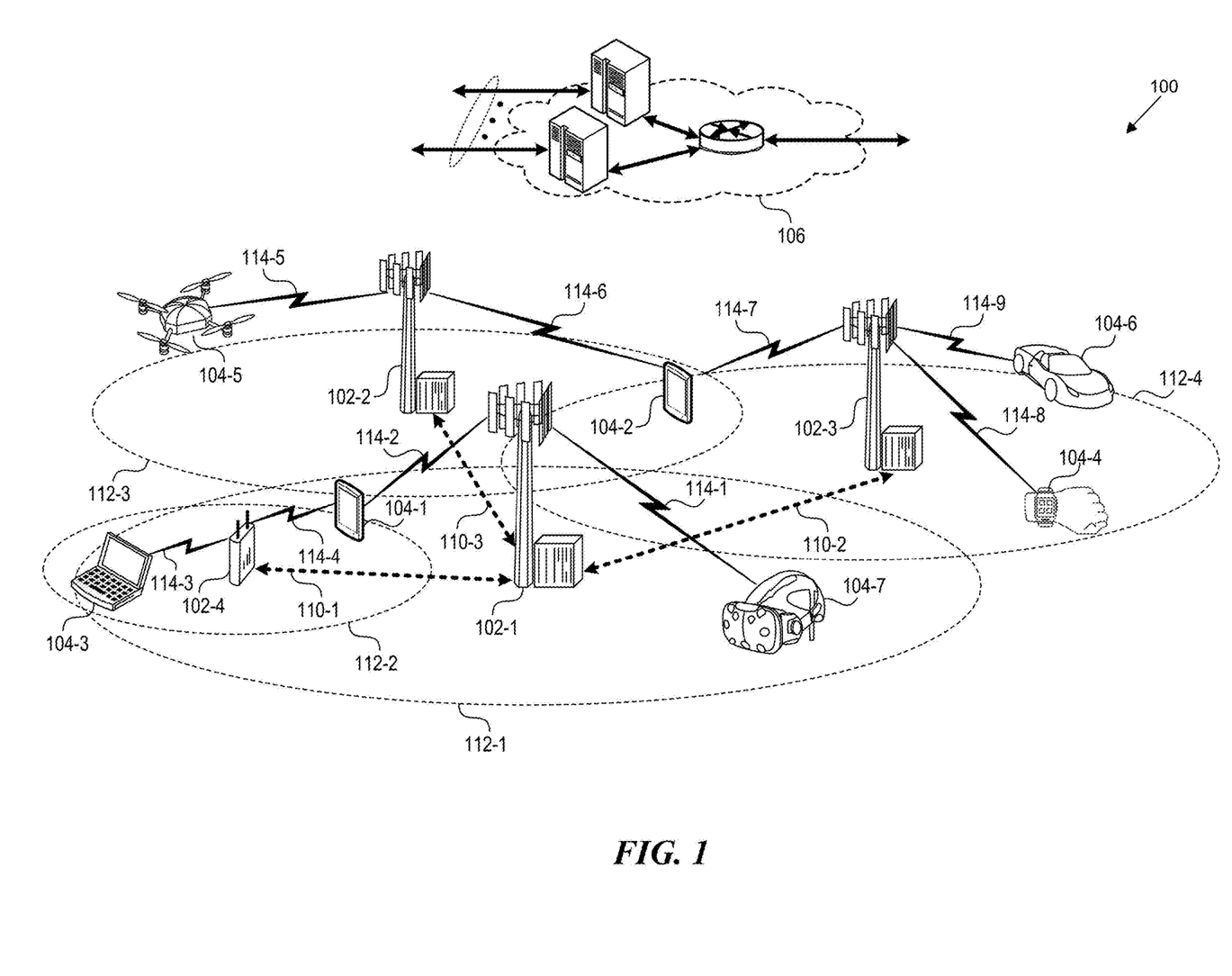
FIG. 1 is a block diagram that illustrates a wireless communications system.

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 24 GHz, 28 GHz, 39 GHz, 47 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing Transmit/Receive diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Emergency Alert System for Differently Abled Persons

Figure 2:
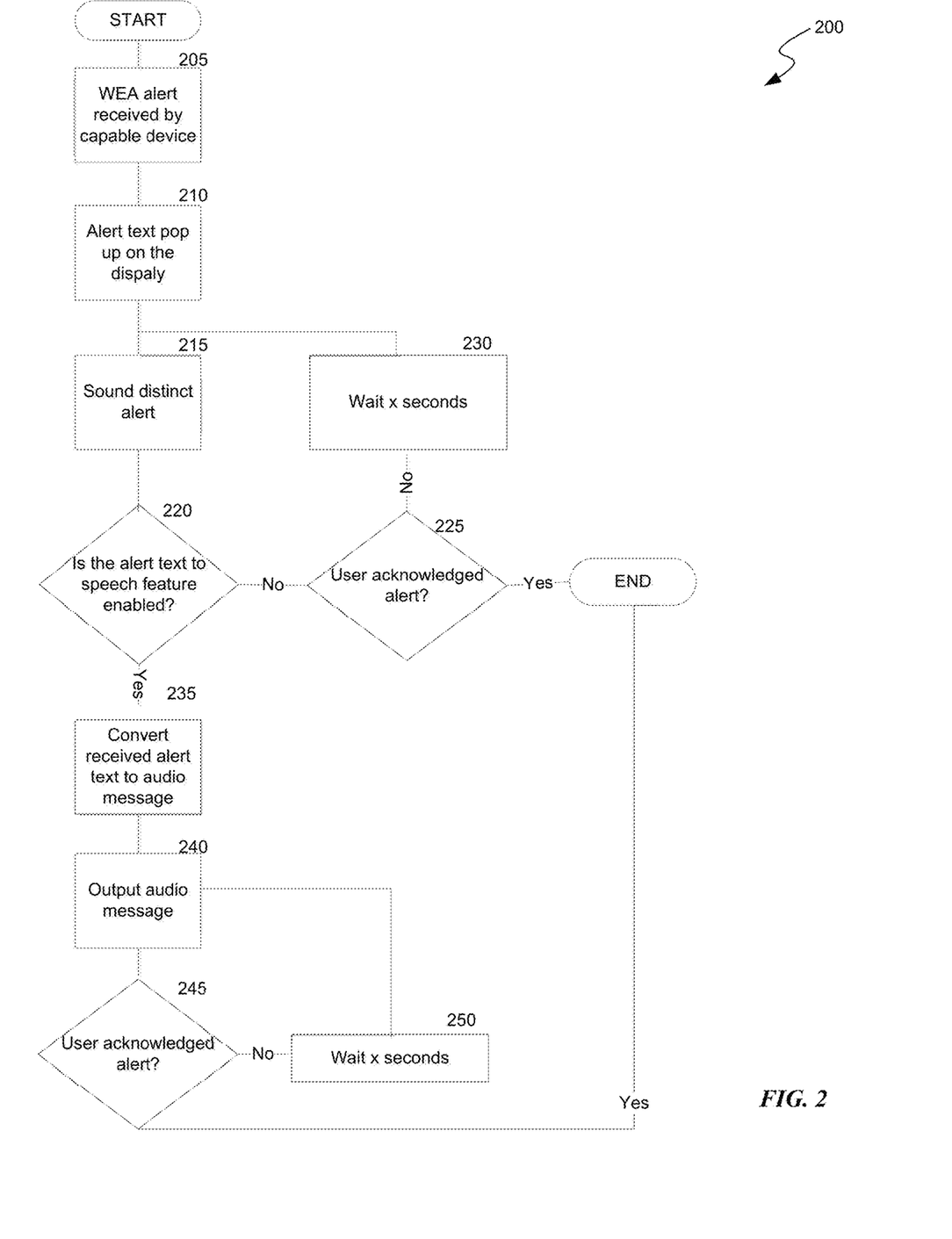
FIG. 2 is a flowchart that illustrates a process performed by the disclosed system in some implementations.

FIG. 2 is a flowchart that illustrates a process 200 performed by the disclosed system in some implementations. Process 200 begins at block 205 by receiving, at a user equipment, an emergency notification message. Examples of user equipment include, but are not limited to personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by a computer system. Examples of the emergency notification messages include, but are not limited to, WEA alert messages, telecommunications carrier alert messages, earthquake alert, tornado alert, blue alert, and so on. The emergency notification message comprises alert data, such as a text conveying the contents of the alert, source of the alert, priority of the alert, severity level of the alert, purpose of the alert, type of the alert, and so on.

Figure 3:
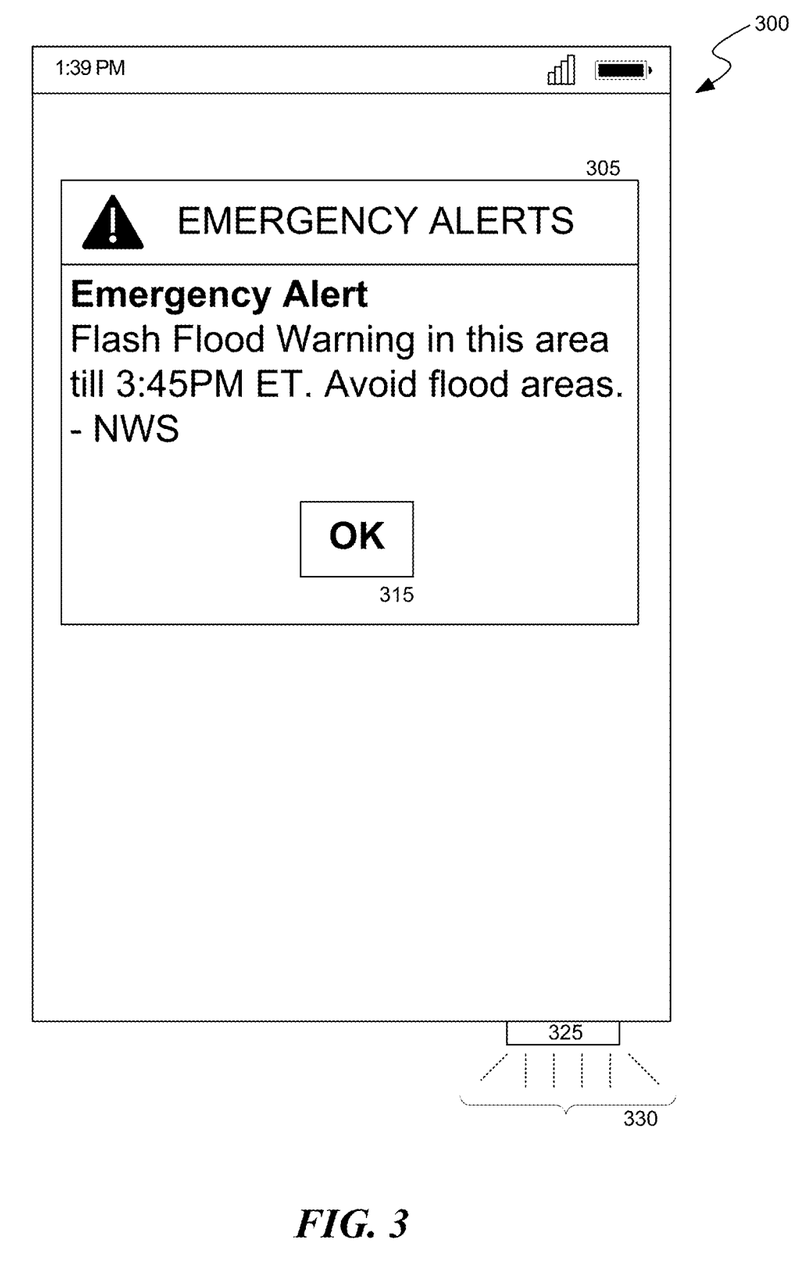
FIG. 3 is a display diagram that illustrates outputs generated by the disclosed system in some implementations.

At block 210, process 200 transcribes all or some of the alert data (e.g., and displays, at a user interface of the user equipment, the transcribed portion of the alert data). For example, FIG. 3 illustrates a user interface of device 300 at which an alert 305 is displayed. A user can interact with the user interface to acknowledge the displayed alert message (e.g., using control 315).

In addition to displaying the transcribed alert data, process 200 can also issue, at block 215, an audible alert signal corresponding to the received emergency notification message. Attributes of the audible alert (e.g., composition, pitch, frequency, rhythm, tune, tone, cadence, etc.) can be selected among a set of attributes based on factors such as, type of the emergency notification message, default value, content of the emergency notification message, severity level of the emergency notification message, severity level of the emergency notification message, purpose of the emergency notification message, user preference value, type of the user equipment, location of the user equipment, telecommunications carrier preference value, prior behavior of a user of the user equipment, and so on. For example, process 200 can select a first audible alert frequency for a first type of emergency notification message and a second audible alert frequency for a second type of emergency notification message. As another example, when process 200 determines that the user equipment is in a noisy environment, it can select an audible alert with louder volume as compared to selecting an audible alert with a lower volume when the user equipment is in a quiet environment. In some implementations, process 200 can enable issuance of the audible alert at a second device configurably connected to the user equipment, such as a wearable device connected via Bluetooth to a mobile device.

At block 220, process 200 can determine whether an alert text-to-speech feature is enabled (e.g., at the user equipment). The alert text-to-speech feature can be stored as a flag value in memory at the user equipment. In some implementations, the alert text-to-speech feature can be stored as a series of flags/values corresponding to factors, such as type of the emergency notification message, default value, content of the emergency notification message, severity level of the emergency notification message, priority of the emergency notification message, purpose of the emergency notification message, user preference value, type of the user equipment, location of the user equipment, telecommunications carrier preference value, prior behavior of a user of the user equipment, and so on. For example, the flag value for a high priority emergency notification message may be set to true as compared to the flag value for a low priority emergency notification message which may be set to false.

When the alert text-to-speech feature associated with the received emergency notification message is enabled, process 200 proceeds to block 235 where it converts some or all of the received alert data to a corresponding audio message. Process 200 can derive, using automated text-to-speech conversion, from the content of the text-based emergency notification message, data or signals that render at least some of the content of the text-based emergency notification message into an audio format. For example, process 200 can invoke a text-to-speech API to convert/translate the alert data to an audio signal that simulates speech. In some implementations, process 200 can generate the audio signal based on speech samples of a user associated with the user equipment. The portion of the received alert data that is transcribed and displayed at the user interface of the user equipment can be the same or different from that converted to a corresponding audio message in a different language. In some implementations, process 200 converts the received alert data, which is in a first language, to an audio message that is in a second, different language. This can be done based on factors such as, user preferences, default language preference values, telecommunications service provider preferences, location of user equipment, type of the user equipment, prior behavior of a user of the user equipment, and so on.

At block 240, process 200 outputs the generated audio message at the user equipment by audibly playing the audio rendition of at least some of the content of the text-based emergency notification message. For example, as illustrated in FIG. 3, process 200 can emit audio signals 330 corresponding to the audio message via one or more speakers 325 of the user equipment 200. In some implementations, process 200 can enable output of the generated audio message at a second device configurably connected to the user equipment, such as a wearable device connected via Bluetooth to a mobile device. In some implementations, after outputting the generated audio message, process 200 proceeds to block 245 where it determines whether a user acknowledged the audio message alert at the user equipment. The acknowledgment can be received by selection of a control (e.g., an "Ok" button) and/or as an audio acknowledgment (e.g., user can use voice command to acknowledge receiving the alert by saying "Yes received" or "OK received", etc.). When an acknowledgment to the audio message is not received from a user within a threshold period of time (at block 250), process 200 can return to block 240 to continue to output the audio message corresponding to the received emergency notification message. The threshold period of time can be determined based on one or more factors, such as type of emergency notification message, location of the user equipment, user preferences, telecommunications service provider preferences, priority level of emergency notification message, severity of emergency notification message, purpose of the emergency notification message, past user behavior, and so on.

When the alert text-to-speech feature associated with the received emergency notification message is not enabled, process 200 proceeds to block 225 where it determines whether a user acknowledged the alert at the user equipment. When an acknowledgement to the text-based emergency notification message is not received from a user within a threshold period of time (at block 230), process 200 can return to block 215 to continue to issue the audible alert signal corresponding to the received emergency notification message. The threshold period of time can be determined based on one or more factors, such as type of emergency notification message, location of the user equipment, user preferences, telecommunications service provider preferences, priority level of emergency notification message, severity of emergency notification message, purpose of the emergency notification message, past user behavior, and so on.

Computer System

Figure 4:
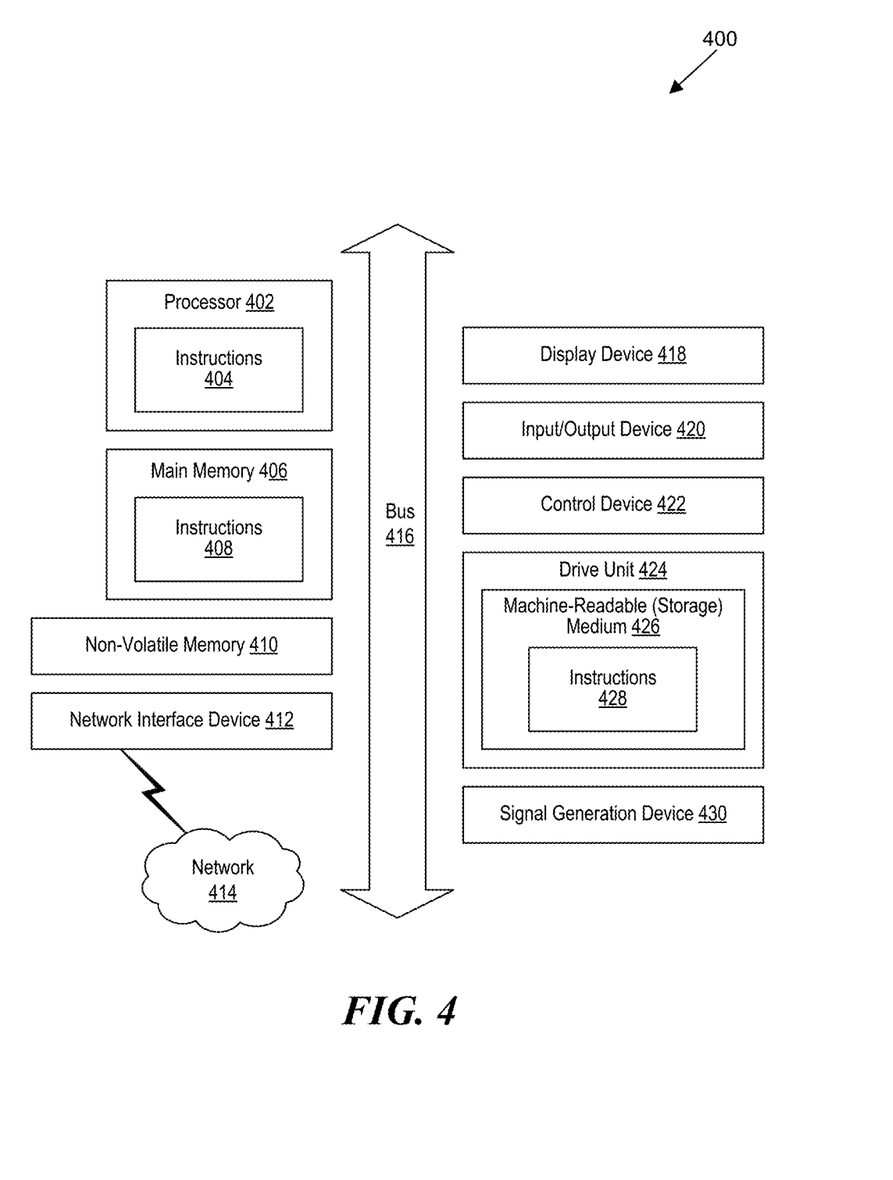
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computer system 400. In some implementations, the computer system 400 can be an embedded computer system, a system-on-chip (SOC), a single-board computer system (SBC), or a distributed system such as a mesh of computer systems, or it can include one or more cloud components in one or more networks. Where appropriate, one or more computer systems 400 can perform operations in real time, in near real time, or in batch mode.

The network interface device 412 enables the computer system 400 to mediate data in a network 414 with an entity that is external to the computer system 400 through any communication protocol supported by the computer system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable (storage) medium 426) can be local, remote, or distributed. Although shown as a single medium, the machine-readable (storage) medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computer system 400. The machine-readable (storage) medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computer system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one non-transitory, computer-readable storage medium carrying instructions, which, when executed by at least one data processor of a system, cause the system to:
  receive, at a mobile device, a wireless emergency alert message comprising alert data;
  display, at a user interface of the mobile device, a transcribed portion of the alert data;
  issue, at the mobile device and based on a first factor, an audible alert signal corresponding to the received wireless emergency alert message,
    wherein the audible alert signal is issued with an attribute, and
    wherein the attribute of the audible alert signal is based on the first factor comprising one or more of:
      a type of the wireless emergency alert message, a severity level of the wireless emergency alert message, a type of the mobile device, a location of the mobile device, or prior behavior of a user of the mobile device;
  compute a threshold period of time based on the first factor,
    wherein the attribute for the audible alert signal is based on the first factor; and
  when an acknowledgement to the audible alert signal is not received from the user within the threshold period of time or when an alert text-to-speech feature is enabled, output, at the mobile device, an audio message corresponding to at least a second portion of the alert data.

2. The at least one non-transitory, computer-readable storage medium of claim 1, wherein the instructions when executed by the at least one data processor of the system further cause the system to: select the audible alert signal from a plurality of audible alerts based on the type of the wireless emergency alert message.

3. The at least one non-transitory, computer-readable storage medium of claim 1, wherein the audible alert signal is outputted at the mobile device.

4. The at least one non-transitory, computer-readable storage medium of claim 1, wherein the audible alert signal is outputted at a second device configurably connected to the mobile device.

5. The at least one non-transitory, computer-readable storage medium of claim 1, wherein the transcribed portion of the wireless emergency alert message and the second portion of the wireless emergency alert message are same.

6. The at least one non-transitory, computer-readable storage medium of claim 1, wherein the transcribed portion of the wireless emergency alert message and the second portion of the wireless emergency alert message are different.

7. The at least one non-transitory, computer-readable storage medium of claim 1, wherein the second portion of the wireless emergency alert message is translated to speech by an application stored on the mobile device.

8. The at least one non-transitory, computer-readable storage medium of claim 1, wherein the second portion of the wireless emergency alert message is translated to speech by a remote server configurably connected to the mobile device.

9. The at least one non-transitory, computer-readable storage medium of claim 8, wherein an audio signal corresponding to the translated speech is generated using audio samples of the user of the mobile device.

10. The at least one non-transitory, computer-readable storage medium of claim 1, wherein the instructions for issuing the audible alert signal cause the system to:
    determine whether the mobile device is in a quiet environment;
    in response to determining that the mobile device is in the quiet environment, issue the audible alert signal with a first volume level; and
    in response to determining that the mobile device is not in the quiet environment, issue the audible alert signal with a second volume level greater than the first volume level.

11. The at least one non-transitory, computer-readable storage medium of claim 1, wherein the wireless emergency alert message is in a first language, and wherein the instructions, when executed by the at least one data processor further cause the system to obtain a translation of the wireless emergency alert message to a second language.

12. A computer implemented method comprising:
    receiving, at a user equipment, a text-based emergency notification message;
    displaying, at a user interface of the user equipment, at least a portion of the text-based emergency notification message;
    issuing, at the user equipment and based on a first factor, an audible alert signal corresponding to the received text-based emergency notification message,
        wherein the audible alert signal is issued with an attribute, and
        wherein the attribute of the audible alert signal is based on the first factor comprising one or more of:
            a type of the text-based emergency notification message, a severity level of the text-based emergency notification message, a type of the user equipment, a location of the user equipment, or prior behavior of a user of the user equipment;
    computing a threshold period of time based on the first factor,
        wherein the attribute for the audible alert signal is based on the first factor; and
    when an acknowledgement to the audible alert signal is not received from the user within the threshold period of time or when an alert text-to-speech feature is enabled, audibly playing, at the user equipment, an audio rendition of at least some of the content of the text-based emergency notification message.

13. The method of claim 12, wherein the text-based emergency notification message is in a first language, and method further comprises: obtaining a translation of the text-based emergency notification message to a second language.

14. The method of claim 12, wherein the text-based emergency notification message is in a first language, and wherein the method further comprises: obtaining a translation of the text-based emergency notification message to a second language, wherein the audio rendition is in the second language.

15. The method of claim 12, wherein the audio rendition is derived using audio samples of the user of the user equipment.

16. The method of claim 12, wherein the audio rendition is derived based on the type of the text-based emergency notification message.

17. The method of claim 12, wherein the audio rendition is played at the user equipment.

18. The method of claim 12, wherein the audio rendition is played at a second device configurably connected to the user equipment.

19. A mobile communications device, comprising:
    at least one transceiver;
    at least one microprocessor; and
    a computer readable memory, the computer readable memory holding instructions that, when executed by the at least one microprocessor, cause the mobile communications device to:
        receive a text-based emergency notification message;
        issue, at the mobile communications device and based on a first factor, an audible alert signal corresponding to the received text-based emergency notification message,
            wherein the audible alert signal is issued with an attribute, and
            wherein the attribute of the audible alert signal is based on the first factor comprising one or more of:
                a type of the text-based emergency notification message, a severity level of the text-based emergency notification message, a type of the mobile communications device, a location of the mobile communications device, or prior behavior of a user of the mobile communications device;
        compute a threshold period of time based on the first factor,
            wherein the attribute for the audible alert signal is based on the first factor;
        when an acknowledgement to the audible alert signal is not received from the user within the threshold period of time or in response to recognition that the user associated with the mobile communications device is not capable of responding to a displayed text-based emergency notification message, audibly play, at the mobile communications device, an audio rendition of at least some of the content of the text-based emergency notification message.

20. The mobile communications device of claim 19, wherein the text-based emergency notification message is in a first language, and wherein the instructions, when executed by the at least one microprocessor further cause the mobile communications device to obtain a translation of the text-based emergency notification message to a second language.

\* \* \* \* \*